Oct. 4, 1966  E. J. TESTA  3,276,136
CHUCK JAW BRACING DEVICE
Filed April 5, 1965
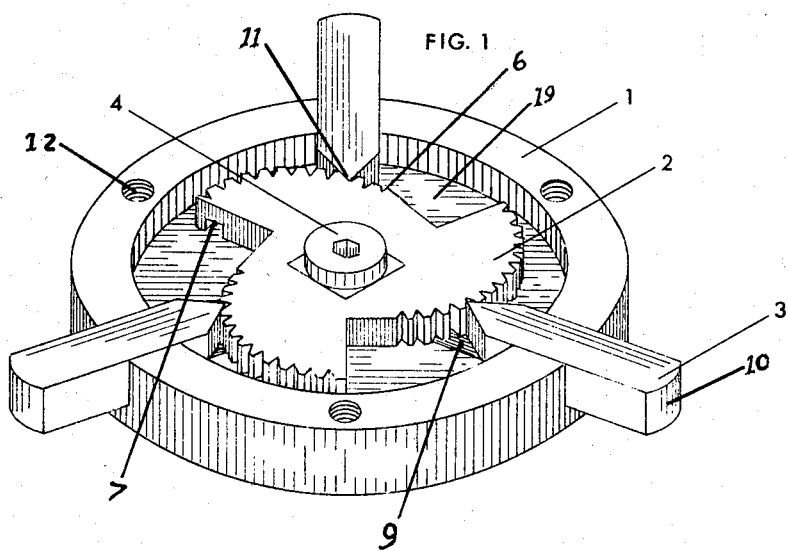
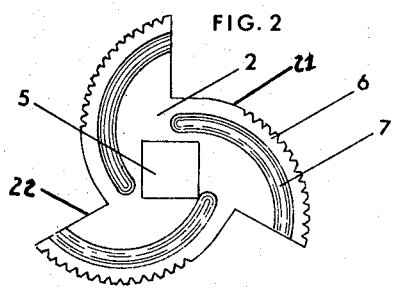
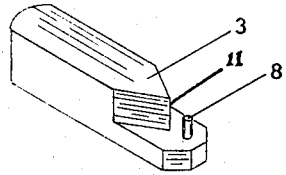
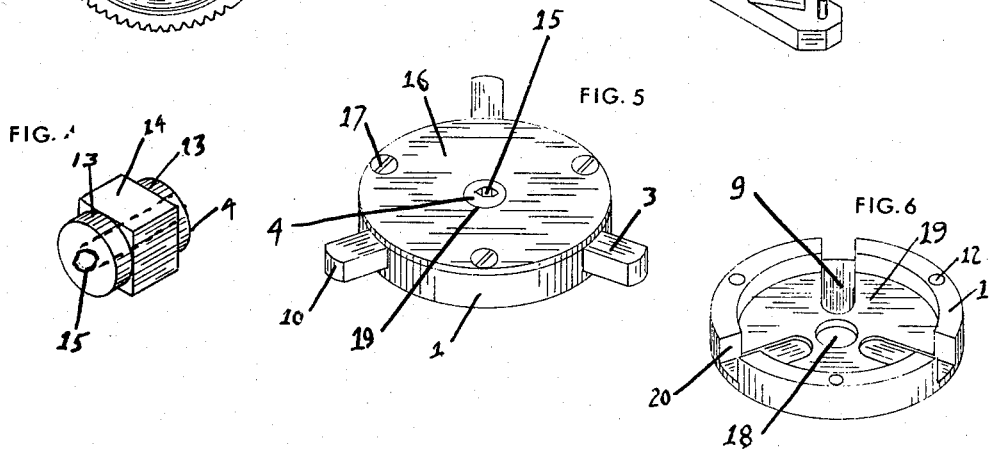
INVENTOR.
Ernest J. Testa
BY Ernest J. Testa
INVENTOR

United States Patent Office 3,276,136
Patented Oct. 4, 1966

3,276,136
CHUCK JAW BRACING DEVICE
Ernest J. Testa, Santa Fe Springs, Calif., assignor to Tesan Tool Manufacturing Company, Santa Fe Springs, Calif.
Filed Apr. 5, 1965, Ser. No. 445,801
6 Claims. (Cl. 33—181)

This invention relates to a device for bracing a set of jaws of a chuck of the type commonly used on a machine tool such as a lathe. In particular it is directed to the problem of holding or bracing a set of jaws on the chuck for the operation of machining the jaws to conform to or fit a particular workpiece. It is often necessary to machine the jaws, at their gripping areas, so that they will match the diameter of a particular workpiece and result in a more efficient gripping manner. Also, this operation trues up the jaws for greater concentricity in holding and machining the workpiece. Usually, in such instances, these chuck jaws are made of a soft steel and are detachably mounted to hardened master jaws.

In order to perform the soft jaw machining operation the jaws must be braced, or immobilized, while leaving the ends of the soft jaws exposed to the cutting tool employed for the operation. This bracing is required to remove all of the slack inherent in the chuck mechanism, and is usually accomplished by tightening the hardened master jaws on to an object that will serve as a brace and yet not interfere with the action of the cutting tool in machining the soft jaws.

The usual machine shop practice, for this operation, is for the machinist to obtain a round metal plate of the approximate required diameter to be gripped by the master jaws, bracing the paws while machining them. The plate is then removed to allow gripping of the workpiece.

A disadvantage of this usual practice is that searching for the correct diameter of the bracing plate required is time consuming and therefore costly. Still another important and costly disadvantage is that the correct diameter required to suit a particular workpiece is often not readily available. The correct diameter being that which is small enough to permit the soft jaws to be adjusted towards the chuck axial center, or inward radially enough for the cutter to remove the required amount of metal, from the jaw ends, to arrive at the correct workpiece matching diameter. If the diameter of this bracing plate is too small it results in removing much more metal from the soft jaws than is required. This waste of soft jaws not only reduces the number of times they can be machined for different workpieces, it also results in costly higher machining time to remove the larger amount of jaw metal.

The present invention makes it unnecessary to waste time hunting for plates of the correct diameter, or keeping on hand an inventory of various diameter plates; it also provides a positive means of quickly adjusting the chuck jaws to a setting requiring only a minimum of metal removal from the jaws.

This invention furnishes these advantages by providing a brace that is radially adjustable to quickly change its diameter to the proper size required for the job at hand. It consists of a flat and round body containing a plurality of slidable and equally spaced rods extending outward from the circumference of the body. The body also contains a centrally located flat cam with a plurality of lobes equal to the plurality of the rods, which in turn is equal to the plurality of chuck jaws that are to be machined. Thus, a brace with two rods are provided for a 2-jaw chuck; a brace with 3 rods are provided for a 3-jaw chuck, etc. Each rod is slidably contained within its groove in the body. The inner end of the rod is in contact with the periphery of the cam lobe. The outer ends of the rods will contact the inner ends of the chuck jaws. The cam will have a pin through a central hole in the cam. The pin will have a hexagon shaped hole longitudinally through its center. One end of the pin is through a round hole in the body. The middle section of the pin is through the cam, and the opposite end of the pin is through a flat cover plate that is fastened to the body. The pin is thus a rotating axis for the cam. A standard hexagon key wrench, of the type used for standard hex socket set screws or hex socket cap screws, is inserted into the hexagon hole of the pin. By manually rotating the wrench this causes the pin to radially drive the cam so that the rods in turn will move in a radial direction at the same progressive rate, either inwards or outwards, depending upon which radial direction the hex wrench is rotated. When the outer ends of the rods have been adjusted radially to the desired diameter, the complete unit, or brace, is positioned in the chuck and the jaws adjusted inward so as to contact the outer end of the rods. As the chuck jaws are tightened against the outer ends of the rods the inner ends of the rods are tightly contacting the cam lobes periphery.

A further feature of this invention are serrations, or teeth, on the periphery of each lobe which engages the pointed inner ends of the rods. This prevents the cam from slipping or turning while under pressure applied through the chuck jaws.

Another feature of this invention is that one side of the cam will have a shallow groove concentric to the cam lobe. A short pin through the inner end of each rod is received by this cam groove to radially retract the rods and to keep the rods from falling out of the brace body.

Another feature of this invention is that by using sets of various length rods, and by changing these rods, the diameter range of each unit can be greatly increased. The rods can be changed without disassembling the brace unit by turning the cam to a point where the open end of the cam groove is over the body groove and the rod pin is free from the cam groove. At this point the rods can be pulled out of the body grooves to be replaced in a like manner with rods of a different length.

Other objects and advantageous features of this invention will be apparent from the following detailed description of the attached drawing, in which:

FIG. 1 is a perspective view of this invention as it would be made for a 3-jaw chuck, showing it as an assembly consisting of the body, center pin, cam and rods but without the top cover plate which is shown in FIG. 5.

FIG. 2 is a front elevational view of the cam.

FIG. 3 is a perspective view of a rod and pin.

FIG. 4 is a perspective view of the rotatable axial pin.

FIG. 5 is a perspective view of FIG. 1, but with the top cover plate assembled.

FIG. 6 is a perspective view of the body.

Referring to the drawing more specifically, body 1 is provided with grooves 9 having square or parallel sides extending radially from its axial center and through its periphery. The grooves correspond in number to the plurality of chuck jaws on the chuck for which this invention would be used. The drawing shows this invention for a 3-jaw chuck. The bottom of these grooves extend somewhat below the counterbored surface 19, forming a shallow portion but becoming a greater depth as it extends through wall thickness 20.

Four-sided, or square, rods 3 slidably fit into grooves 9 with their points 11 inward and pins 8 extending upwards.

Cam 2 is a plate formed with a number of peripheral lobes 21 equal to the number of rods 3 and grooves 9 employed. The peripheral edge 21 of each lobe is curved gradually so that they increase in radial dimension progressively at the same rate, in the same circumferential direction. The periphery of the cam contains a shoulder 22 which extends outward from the minimum radial dimension of one lobe to the maximum radial dimension of the adjacent lobe. The periphery of each lobe has a series of serrated shallow teeth 6 having angled sides thus forming a ratchet. Grooves 7 are formed on one side of the cam concentric to the peripheral lobe 21 and extending open from shoulder 22 to a closed end at a point approximately in line with the next or adjacent shoulder. The dimension or width between the outer edge of groove 7 and the periphery of lobe 21 is somewhat less than the space between the outer circumference of pin 8 and the apex of point 11 on rod 3. Cam 2 is also provided with a square aperture 5 through its center. Cam 2 is placed into counterbore 19 in body 1 with the cam 2 side containing grooves 7 down or next to counterbore 19 bottom. Pins 8 are then contained within grooves 7.

Axial pin 4 is placed into the assembly with one round end 13 into body hole 18, and the square middle section 14 into the cam's square hole 5, and the other round end 13 through round hole 4 of cover plate 16, which is fastened to body 1 with screws 17 into threaded bore 12.

The thickness of cam 2 is somewhat less than the depth of counterbore 19 in body 1 and the thickness of rods 3 are somewhat less than the extreme depth of grooves 9 at the point of opening 20 in body 1, thus when cover plate 16 is assembled the rods 3 are slidably unrestricted and the cam 2 is rotatably unrestricted.

The length of the square section 14 on axial pin 4 is somewhat less than the depth of counterbore 19 and the diameters 13 are somewhat less than the diameters of bore 18 in body 1 and bore 19 in cover plate 16, so that the axial pin is rotatably unrestricted in the assembly. The end faces of square section 14 provides the shoulders that prevents axial pin 4 from slipping or falling through bores 18 and 19.

In the operation of this invention, a common hexagon wrench, of the type used in socket set or cap screws, is inserted into the hex bore 15 in axial pin 4. If the hex key is inserted in the cover plate 16 side, as shown in FIG. 5, and manually rotated clockwise the cam 2 is rotated in the same direction driven by axial pin 4. The cam rotation progressively increases the radial dimension of peripheral lobes 21 at the point of contact with points 11 on rods 3. This in turn slidably pushes the rods 3 radially outward, increasing the peripheral diameter of ends 10 on rods 3.

When the hex wrench is manually rotated in the opposite, or counterclockwise direction, the cam rotation progressively decreases the radial dimension of grooves 7, causing a point of contact with pins 8 and the outer side walls of grooves 7, which, in turn, slidably pulls the rods 3 radially inward, decreasing the peripheral diameter of ends 10 on rods 3.

Rods 3, of a shorter or longer overall length, can quickly be changed to increase the diameter range by rotating the cam until the opening of groove 7 is at a point that frees pins 8, at which point the rods can be manually pulled out of the body and other rods inserted to a point where pins 8 are adjacent to the opening of grooves 7. At this point the cam is rotated, causing the grooves 7 to engage pins 8 and rotation continued until the desired adjustment is obtained.

In prepartion to machine the chuck soft jaws, the chuck jaws are opened up so that this invention can be positioned with the inner ends of each permanent jaw tightened against each end 10 of rods 3. Points 11 of rods 3 engage into the shallow depths of cam serrations 6 which prevents the cam from rotating in reaction to the radially inward pressure of the chuck jaws.

Some of the present devices on the market for machining chuck jaws consist of a thin plate in the shape of a cam. Because of their design the radial center of the chuck jaws do not come in contact with the exact radial center of these cam plates. Instead, the contact point is away from the jaws' centerline, causing the jaws to tilt somewhat. This condition is not the best for precision jaw machining. Also, these cam plates are thin and flimsy, causing them to buckle or warp under pressure.

This invention overcomes these deficiencies by receiving the chuck jaws' pressure exactly on center radially and is designed with ample thickness and strength to withstand chuck jaw pressure.

It is apparent that a single brace unit, of this invention, is adjustable through a wide range of radial dimensions, making it possible to adjust the chuck jaws to the correct dimension for machining a minimum of metal from the jaws, thereby minimizing waste and saving time. Also, by merely changing rods from those of one length to another the range can be greatly increased.

I claim:

1. A brace for use in the machining of lathe chuck jaws comprising a brace body; a plurality of detachable rods slidably held in grooves in the brace body for radial movement with respect thereto; a rotatable cam with a plurality of peripheral, serrated lobes that is centrally contained within the brace body and which, upon rotation, causes radial movement of the slidable rods; a rotatable axial pin contained by having one of its round ends contained in a circular hole through the center of the brace body, and its square middle section contained in a square hole that is through the center of the rotatable cam, and which upon manually rotating the axial pin by means of inserting a hexagon wrench tool into a hexagon hole through the pin's axial center causes the cam to rotate and in turn causes the slidable rods to move radially; a cover plate containing a round hole which receives a round end of the axial pin and is fastened to the brace body by means of threaded screws.

2. A brace according to claim 1, characterized in that the body is circular and flat in shape, having a counterbore through the center of which is a round hole and extending radially outwards from the hole are a multiple of straight grooves extending through the periphery of said body.

3. A brace according to claim 1 characterized in that the rods have a portion of one end thinner in the form of a step and through this thin portion a hole close to its end having a pin protruding through it. The thick portion of the rod, at the thin stepped end, terminates in the form of a point with its apex near to, but not contacting the pin.

4. A brace according to claim 1 characterized in that the cam has a plurality of serrated peripheral lobes, one side of the cam having a plurality of radial circular grooves that are proximate to, and concentric with, the serrated peripheral lobes. Said cam having a square hole through its axial center.

5. A brace according to claim 1 characterized in that the axial pin has each of its two ends round in shape and its middle section square in shape and through the axial center of said pin is a hexagon shaped bore.

6. A brace according to claim 1 characterized in that the cover plate is circular and flat in shape and having a circular hole through its axial center, and mounting holes proximate to its periphery.

No references cited.

WILLIAM W. DYER, JR., *Primary Examiner.*

L. VLACHOS, *Examiner.*